Patented Feb. 16, 1943

2,311,338

UNITED STATES PATENT OFFICE 2,311,338

WAX COMPOSITION

John B. Holtzclaw, Roselle, and John E. Clemens, Elizabeth, N. J., assignors to Standard Oil Development Company, a corporation of Delaware No Drawing. Application March 22, 1939, Serial No. 263,410

10 Claims. (Cl. 106—271)

The present invention relates to an improved wax composition. The invention is especially concerned with an improved anhydrous wax composition comprising essentially a highly dispersed colloidal solution of a crystalline high molecular weight wax and a petroleum oil solvent.

It is well known in the art to prepare various wax compositions suitable for protective coatings on surfaces such as floors, furniture, automobiles, and the like. These compositions comprise various waxes such as beeswax, vegetable waxes, various petroleum waxes, and the like, as well as mixtures of suitable waxes. It is also known to use high molecular weight crystalline waxes which comprise essentially an ester of a high molecular weight monohydric alcohol and a high molecular weight acid, as for example, carnauba wax, montan wax, and various synthetic waxes. These waxes are highly desirable for providing protective wax coatings on surfaces which are exposed to sunlight since they have an inherent characteristic of being relatively stable in the presence of ultra violet light. However, heretofore, due to their physical properties, it has not been possible to prepare suitable wax compositions comprising high molecular weight waxes of this character except by blending with other softer waxes, as for example, petroleum wax, beeswax, and the like, or by preparing aqueous emulsions of the same. These wax compositions comprising an ester wax of a high molecular weight monohydric alcohol and a high molecular weight acid and an added softer wax and the like have not been entirely satisfactory since the softer waxes do not have the property of being stable in the presence of ultra violet light and therefore decompose, causing the deterioration of the wax surface, both in the glossiness of the same and in the protective qualities. Water emulsions also have not been entirely satisfactory since it is necessary to add emulsifying agents which are not desirable in protective wax surfaces, especially in those surfaces exposed to direct sunlight. These emulsifying materials readily decompose, especially when exposed to sunlight, sulfur dioxide and the like and thus accelerate decomposition and failure of the protective wax surface. Furthermore, the emulsifying materials render the surface susceptible to moisture which is undesirable since the gloss is thus readily removed and the protective qualities of the wax surface impaired. It is also rather difficult in preparing wax compositions of a high molecular weight wax to secure a fine dispersion of minute crystals throughout the solvent. This is desirable since the ease of polishing free of streaks, and the like, is to a large extent a function of crystalline size and the extent to which dispersion of the crystals is secured throughout the solvent.

We have now discovered a process by which it is possible to produce a highly dispersed colloidal solution of a crystalline high molecular weight ester wax of a high molecular weight monohydric alcohol and a high molecular weight acid in a suitable solvent. Our process is particularly applicable to the preparation of improved wax compositions comprising a critical quantity of carnauba wax in a petroleum oil solvent. Our wax composition is entirely anhydrous, requiring the use of no emulsifiers and containing no other wax, thus eliminating the possibility of the deterioration of the wax surface in the presence of ultra violet light. The wax composition of the present invention comprises essentially 1% to 5% of an ester wax of a high molecular weight alcohol and a high molecular weight acid in a petroleum oil solvent. If carnauba wax be used, the preferred composition comprises essentially from about 2% to 4% of carnauba wax and from about 96% to 98% of a petroleum oil solvent.

Our wax composition in accordance with the present invention is produced by melting carnauba wax or a similar wax on a steam bath or under other suitable conditions. After the wax is melted, a solvent, at a temperature of about not less than 185° F., is added and a complete solution secured. The mixture is then cooled gradually to room temperature which causes the formation of relatively small granular crystals in the solvent. The cooled wax composition is then passed through a colloid mill by which a colloidal solution of highly dispersed crystalline wax crystals is secured in the solvent. This composition may be then readily applied and the film may be easily polished free of streaks, leaving a water resistant surface which remains stable in the presence of heat and ultra violet light.

The wax used is a crystalline wax comprising a straight chain ester of a high molecular weight monohydric alcohol and a high molecular weight acid. Both the alcohol and the acid must have at least 24 carbon atoms in the molecule. The preferred wax is carnauba wax, although montan wax or synthetic waxes of similar composition and properties may be used, as for example, a wax manufactured and sold under the trade name of "I. G. Wax E."

The wax is preferably heated to a temperature immediately above its melting point, care being exercised that too high a temperature be not employed, since decomposition may occur. When utilizing carnauba wax, the temperature should be in the range from about 185° F. to 212° F.

The solvent used may be any highly paraffinic solvent characterized by being completely miscible with the wax at the temperatures in the range above the melting point of the wax and having relatively small solubility for the wax at atmospheric temperatures. This is essential since if a solvent, as for example, a highly aromatic solvent, be used, a considerable amount of wax would remain dissolved in the solvent at atmospheric temperature. This is undesirable since a solvent which dissolves any substantial amount of wax will have difficulty in evaporating when the solution is applied to a surface because of the wax skin formations. Preferred solvents are highly paraffinic petroleum oil fractions boiling in the range from about 300° F. to 600° F., preferably in the range from 300° F. to 450° F.

The rate of cooling should be relatively slow, although it may be accelerated somewhat by circulating water. Cooling conditions are so adjusted so as to secure a minimum of granular crystalline structures in the composition. The formation of the highly dispersed colloidal wax solution by passing the cooled composition through a colloid mill should be so conducted that a minimum temperature rise will be secured. This is to prevent the wax from going into solution and thus prevent the subsequent recrystallization of granular wax crystals. In order to further illustrate the invention, the following example is given which should not be construed as limiting the same in any manner whatsoever:

*Example*

100 parts of carnauba wax were melted on a steam bath by heating to a temperature of about 190° F. About 2400 parts of a highly paraffinic petroleum oil solvent boiling in the range between about 300° F. to 450° F. were then heated to 190° F. and added to the liquid wax. The solvent and the oil were mixed to form a complete solution comprising approximately 4% carnauba wax and 96% petroleum oil solvent by volume. A small amount of pale green dye was added to the heated solution. The solution was allowed to cool to room temperature. The cooled composition was then passed through a colloid mill, care being exercised that the temperature of the composition did not rise substantially above 75° F. The resulting product was a highly dispersed colloid solution of the crystalline carnauba wax in the solvent.

Upon testing the product with other commercial waxes, the results secured were as follows:

|  | Commercial wax | Carnauba wax in petroleum oil solvent |
|---|---|---|
| Actual time required to apply (using commercial wax as 100%). | 100% | 60%. |
| Luster | | Much better. |
| Life of wax coating | 100%. Spotted in rain. | Greater than 200%. Did not spot in rain. |

The present invention is not to be limited by any theory or mode of operation, but only by the following claims in which it is desired to claim all novelty in so far as the prior art permits.

We claim:

1. Process of manufacturing anhydrous highly dispersed colloidal wax compositions of a crystalline high molecular weight ester wax of an aliphatic high molecular weight monohydric alcohol and an aliphatic high molecular weight acid comprising melting said wax, adding thereto a heated highly paraffinic petroleum distillate boiling between about 300° F. and 600° F., in which the said wax is completely miscible at temperatures above the melting point of the wax, but in which the wax at atmospheric temperatures has relatively small miscibility, to prepare a mixture containing from 1% to 5% of the wax, slowly cooling the same to atmospheric temperatures and passing the same through a colloid mill.

2. Process of manufacturing an anhydrous highly dispersed carnauba wax composition and a petroleum oil comprising melting the carnauba wax, adding thereto a heated highly paraffinic petroleum distillate boiling between about 300° F. and 600° F., in which the said wax is completely miscible at temperatures above the melting point of the wax, but in which the wax at atmospheric temperatures has relatively small miscibility, to prepare a mixture containing from 2% to 4% of the carnauba wax, cooling the heated mixture slowly to atmospheric temperatures, and then passing the same through a colloid mill.

3. An anhydrous wax composition comprising from 2% to 4% of carnauba wax colloidally dispersed as such in from 96% to 98% of a highly paraffinic petroleum oil distillate boiling in the range from about 300° F. to 450° F., in which the carnauba wax is completely miscible at temperatures above the melting point of the wax, but in which the carnauba wax at atmospheric temperatures has relatively small miscibility.

4. An anhydrous fluid wax composition consisting essentially of 1% to 5% of a crystalline ester wax of an aliphatic high molecular weight monohydric alcohol and an aliphatic high molecular weight acid colloidally dispersed as such in a highly paraffinic petroleum distillate boiling above about 185° F. and below about 600° F., in which the said wax is completely miscible at temperatures above the melting point of the wax, but in which the wax at atmospheric temperatures has relatively small miscibility.

5. An anhydrous fluid wax composition comprising from about 1% to 5% of a crystalline ester wax of an aliphatic high molecular weight monohydric alcohol and an aliphatic high molecular weight acid colloidally dispersed as such in about 95% to 99% of a highly paraffinic petroleum distillate of which the major portion boils between about 300° F. and 600° F., in which the said wax is completely miscible at temperatures above the melting point of the wax, but in which the wax at atmospheric temperatures has relatively small miscibility.

6. A composition in accordance with claim 5 in which said monohydric alcohol and said aliphatic acid have each at least 24 carbon atoms in the molecule.

7. A composition in accordance with claim 5 in which the said ester wax is carnauba wax present in an amount from 2% to 4%.

8. An anhydrous wax composition consisting essentially of from about 1% to 5% of a crystalline ester wax of an aliphatic high molecular weight monohydric alcohol and an aliphatic high molecular weight acid colloidally dispersed as such in from about 95% to 99% of a highly paraffinic petroleum distillate boiling between about 300° F. and 600° F. which is characterized by having a high solubility for the wax at its melting point and which dissolves a relatively small amount of the wax at atmospheric temperatures.

9. A wax composition in accordance with claim 8 in which the paraffinic distillate boils in the range from 300° F. to 450° F.

10. A wax composition in accordance with claim 8 in which said ester wax is carnauba wax present in an amount from 2% to 4%.

JOHN B. HOLTZCLAW.
JOHN E. CLEMENS.